(12) United States Patent
Siala (10) Patent No.: US 6,174,092 B1
(45) Date of Patent: Jan. 16, 2001

(54) METHOD AND APPARATUS FOR COUPLING AN OPTICAL FIBER TO AN OPTOELECTRONIC DEVICE

(75) Inventor: Sabeur Siala, Sunnyvale, CA (US)

(73) Assignee: OESYS Photonics, Inc., Sunnyvale, CA (US)

( * ) Notice: Under 35 U.S.C. 154(b), the term of this patent shall be extended for 0 days.

(21) Appl. No.: 09/229,054

(22) Filed: Jan. 11, 1999

(51) Int. Cl.$^7$ .................................................. G02B 6/36
(52) U.S. Cl. ................................ 385/91; 385/88; 385/90
(58) Field of Search ............................ 385/91, 88–94, 385/49, 51, 14, 83, 33, 130

(56) References Cited

U.S. PATENT DOCUMENTS

| | | | |
|---|---|---|---|
| 4,752,109 | 6/1988 | Gordon et al. | 350/96.2 |
| 4,880,290 | 11/1989 | Kumazawa et al. | 350/96.2 |
| 4,892,377 | 1/1990 | Randle | 350/96.2 |
| 5,386,488 | 1/1995 | Oikawa | 385/92 |
| 5,619,609 | 4/1997 | Pan et al. | 385/136 |
| 5,692,086 | 11/1997 | Beranek et al. | 385/94 |
| 5,745,624 | * 4/1998 | Chan et al. | 385/91 |

OTHER PUBLICATIONS

Lipson et al., "Opto–Mechanical Considerations for Laser–Fiber Coupling and Packaging", 1985, SPIE vol. 554 International Lens Design Conference. No Month.

Penn et al., "Laser Soldering For Electronic Packaging", 1984, International Electronics Packaging Conference. No Month.

Scott Enochs, "A Packaging Technique to Achieve Stable Single–Mode Fiber to Laser Alignment", 1986, SPIE vol. 703, Integration and Packaging of Optoelectronic Devices. No Month.

Krista McEuen, "Diode Lasers Solve Soldering Problems", Feb. 1998, Industrial Laser Review, Application Report.

"Merging of Optoelectronic Integration and MCM Technology", Hybrid Technology for Optpelectronic Packaging, Section 10.4, pp. 170–178. No Date.

* cited by examiner

Primary Examiner—Phan T. H. Palmer
(74) Attorney, Agent, or Firm—Ritter, Van Pelt & Yi LLP (57) ABSTRACT

A method of aligning an optical fiber for coupling light to or from an optical device and fixing the optical fiber to an optical fiber support is disclosed. The method includes positioning the optical fiber into alignment with the optical device. An adapter is positioned between the optical fiber and the optical fiber support. The adapter is formed to substantially fill a gap between the optical fiber and the optical fiber support. The adapter is fixed to the optical fiber support and the adapter is fixed to the optical fiber.

14 Claims, 8 Drawing Sheets

METHOD AND APPARATUS FOR COUPLING AN OPTICAL FIBER TO AN OPTOELECTRONIC DEVICE

BACKGROUND OF THE INVENTION

1. Field of the Invention

The present invention relates generally to optical fiber networks. More particularly, a system and method are disclosed or coupling light from a laser into an optical fiber. "Pigtailing" is the term commonly used to describe the process of aligning and attaching an optical fiber in front of an active optoelectronic device such as a laser diode for a photodiode.

2. Relationship to the Art

Fiberoptic networks are commonly used to transmit both voice and data. A key economic consideration in the design of a fiberoptic network is the maximum length of fiber that may be included between two points before it is necessary to include a signal repeater in the communication path that retransmits the signal. The reason that the signal must be repeated or retransmitted is that as the signal is transmitted along an optical fiber, the signal is attenuated due to the light that carries the signal either leaking out of the fiber or being absorbed by the material from which the fiber is made. When the strength of the signal falls below a certain level as a result of this attenuation, then the signal to noise ratio of the system may become too low for effective data transfer to be maintained.

One way to increase the signal to noise ratio of a transmitted signal is to increase the power of the light transmitted into the optical fiber. For a given amount of attenuation per length of fiber, increasing the power input to the fiber increases the distance that the fiber may be run before the signal level becomes unacceptably small. Of course, one way of increasing the power input to the fiber is to increase the power of the laser used to generate the light that is coupled to the fiber. Another way of increasing the strength of the signal carried by the fiber is to more efficiently couple the modulated light from the laser into the fiber. In general, coupling the light from the laser into a flat-end (as cleaved) fiber is very inefficient, with only about 10 to 15 percent of the laser light output being coupled into the fiber.

The signal to noise ratio of a signal received from the fiber may likewise be increased by increasing the efficiency of the coupling of light from the fiber to a detector used to receive the signal carried by the fiber.

Various techniques have been developed for increasing the amount of light coupled into an optical fiber from a laser diode and of increasing the efficiency of the coupling of light out of an optical fiber to an optoelectronic device such as a detector. For example, lenses are used to gather light from a laser source and focus the light on an end of an optical fiber so that more of the light from the laser is coupled into the fiber. Discrete lenses have been used for this purpose. Lenses have also been formed on the tips of optical fibers.

Figure 1:
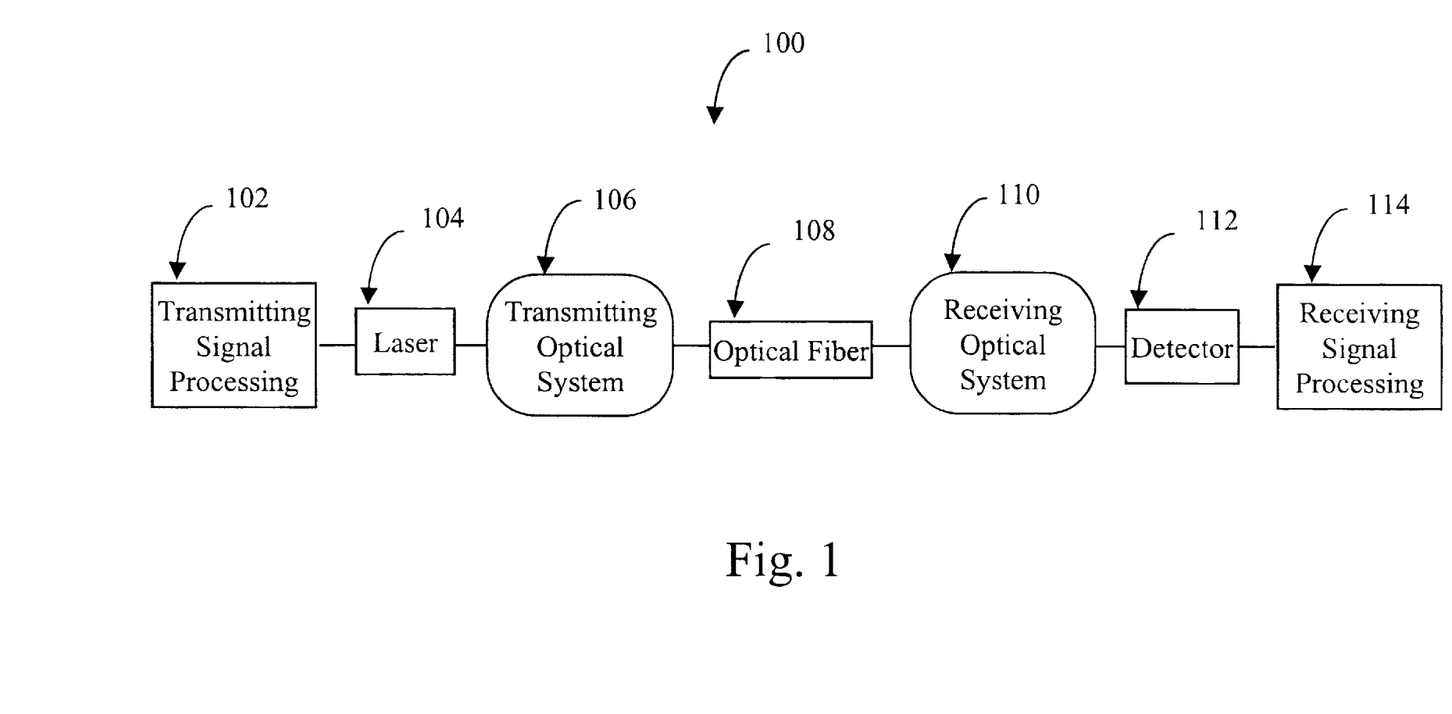
FIG. 1 is a block diagram illustrating a simplified fiberoptic system 100 for transmitting and receiving.

FIG. 1 is a block diagram illustrating a simplified fiberoptic system 100 for transmitting and receiving. A transmission signal processing block 102 provides a modulation signal containing data to a laser 104. The output of laser 104 is coupled by an optical system 106 into an optical fiber 108. As noted above, optical fiber 108 tends to attenuate the light coupled into it by optical system 106. At the other end of optical fiber 108, the light is coupled by a receiving optical system 110 into a detector 112 that generates a signal for a receiving signal processing system 114.

In general, the light coupled into or out of the optical fiber is highly sensitive to the alignment of the optical fiber with the laser or the detector and any optical system that is used between the optical fiber and such devices. A slight misalignment of the optical fiber may cause a large decrease in the amount of light coupled into the fiber from the laser or out of the fiber to the detector. In general, this problem is more serious at the laser end because the size of the emitting region of a typical laser diode used in a system is approximately 2 $\mu$m by 4 $\mu$m. In general, the detector is somewhat larger, but the importance of exact alignment is still important. It should also be noted that the use of focusing optics to focus light from the laser into the optical fiber may increase the light coupled into the cable but also increases the sensitivity of the amount of coupling to the alignment of the cable with the source and any discrete optical devices used.

Figure 2:
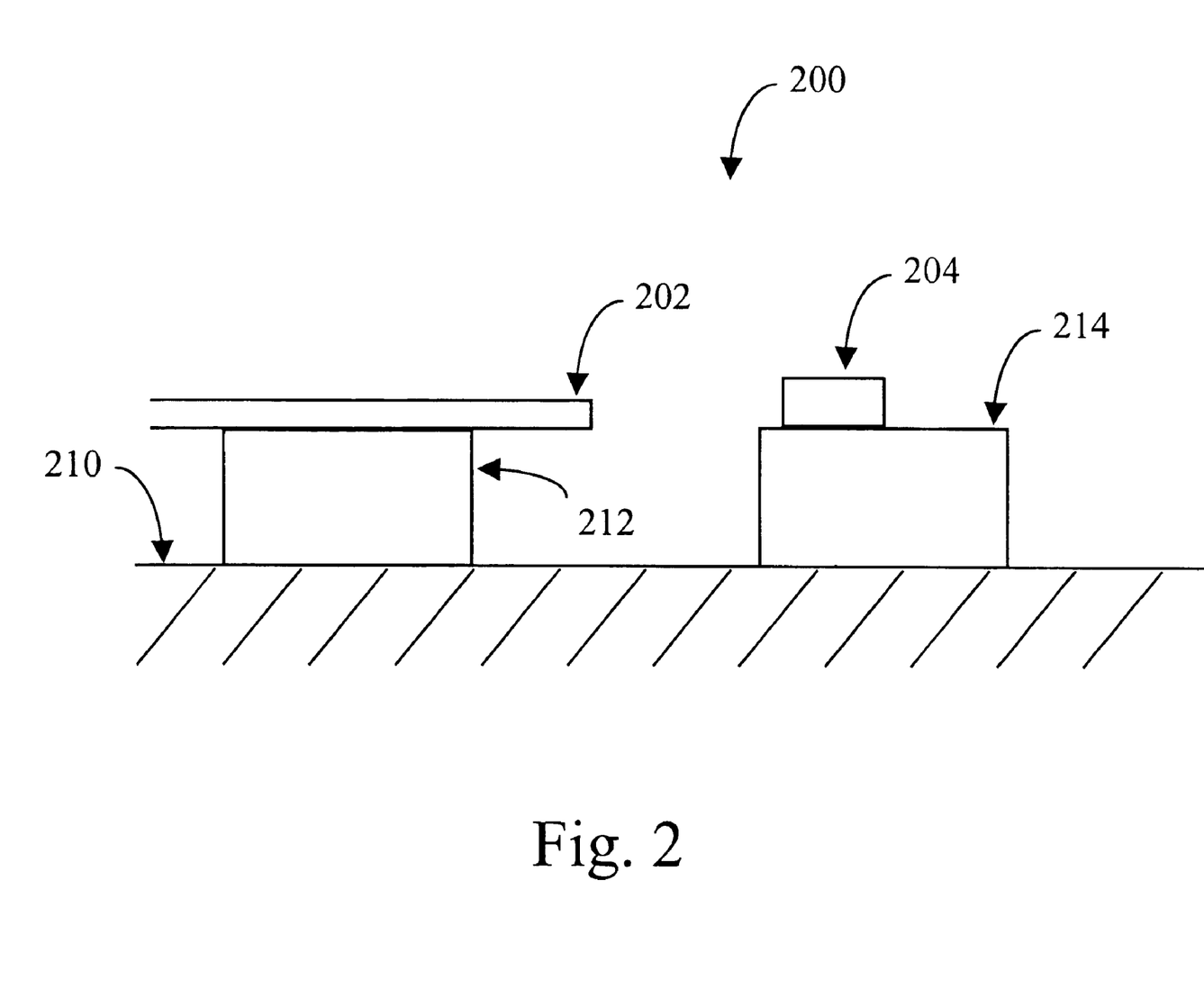
FIG. 2 is a block diagram illustrating an optoelectronic system that includes a optical fiber end and an optoelectronic device.

Various techniques have been developed for aligning optical fiber with optoelectronic devices. FIG. 2 is a block diagram illustrating an optoelectronic system 200 that includes a optical fiber end 202 and an optoelectronic device 204. As mentioned above, optoelectronic device 204 may be a laser diode or a detector. Optical fiber 202 is supported by a pedestal 212 and optoelectronic device 204 is supported by a pedestal 214. The pedestals rest on a substrate 210. As mentioned above, aligning and fixing optical fiber 202 is critical to maintaining optimal coupling between optical fiber end 202 and optoelectronic device 204.

Alignment of optical fiber 202 with optoelectronic device 204 may be accomplished by using a micro positioner to change the position of optical fiber 202 while measuring the amount of light coupled from optical fiber 202 to optoelectronic device 204. If, for example, optoelectronic device 204 is a laser diode, the light coming out of the other end of optical fiber 202 may be measured and optical fiber 202 may be positioned so that the amount of light output is maximized. Once optical fiber 202 is properly positioned, it is desirable to fix the cable to pedestal 212 in a manner that maintains the alignment.

Numerous methods of fixing optical fibers to supports have been developed. These methods include using epoxy to glue the fiber to a mount, laser welding the fiber to a mount, and soldering the fiber to a mount. While a certain amount of success has been enjoyed using each of those methods, improved performance, especially under varying temperatures is desired, and each of the methods mentioned currently have drawbacks. For example, when epoxy is used to glue the optical fiber to a mount, outgassing and softening of the epoxy has been a problem. As a result, epoxy is seldom used to attach optoelectronic fibers in telecommunication applications. Epoxy has had some use in fiberoptic local area network applications, however.

Another method, laser welding, is commonly used to fix optical fibers to mounts. A joint is formed using a metal to metal weld using a high power laser. For example, a fiberoptic support clip that is laser welded to a sleeve that holds a optical fiber is disclosed in U.S. Pat. No. 5,619,609, issued to Pan et al. which is herein incorporated by reference for all purposes. Pan et al. teaches a special clip that includes a channel having sides that are laser welded to the sleeve which holds the optical fiber. Although such laser welding techniques have proven useful, laser welding equipment is both expensive and difficult to configure for use in fiber pigtailing. In addition, a relatively large amount of energy is delivered during laser welding and the thermal shock that results tends to alter the alignment of the optical fiber during the welding process. Various methods have been designed for causing the incident laser energy to be symmetrically delivered to try to cancel out these effects.

An alternative method is soldering. One preferred soldering method is laser soldering. In laser soldering, an infrared laser is used as a heating source to melt solder that is used to fix a fiber or other device in place. The fiber or device must be metallized for solder to be applied.

The amount of energy delivered during a laser soldering process is much less than the energy required for laser welding. For example, some laser soldering processes use about five watts of energy, which is about a factor of ten less than the amount of energy required for laser welding. A solder preform used to fix a optical fiber is described in U.S. Pat. No. 5,692,086, issued to Beranek et al., which is herein incorporated by reference for all purposes. In general, solder may be used to fix a optical fiber and either laser energy or a more conventional hot plate may be used to melt the solder and fix the optical fiber. However, the use of high temperature solder is generally preferred to provide a solder joint of the desired strength and this may cause difficulty in the soldering hierarchy of the optoelectronic system if a hotplate is used. Therefore, laser soldering is preferred, since high temperature solder may be used.

Although good results have been realized using laser soldering, misalignment tends to occur with variation in temperature since the solder generally has different thermal characteristics than the other materials that are included in the optoelectronic packaging. Misalignment is particularly acute when high temperature solder is used. There is a need, therefore, for designing methods of decreasing misalignment in systems that use solder to fix an optical fiber in alignment with an optoelectronic device. There is especially a need to improve the performance of such systems under varying thermal conditions.

SUMMARY OF THE INVENTION

The present disclosure describes several methods of improving the alignment of optical fibers fixed using laser soldering. The methods enable pigtailing to be done repeatably. In one embodiment, an optical fiber is fixed to a pedestal using an especially adapted sleeve that minimizes the gap between the sleeve and the pedestal that is filled with solder. By minimizing the amount of solder, mechanical movement of the optical fiber due to expansion and contraction resulting from temperature change is minimized relative to the rest of the optoelectronic system. As a result, alignment is maintained under varying thermal conditions. In other embodiments, laser solder joints are provided which either minimize gaps that contain solder or else provide arrangements that minimize misalignment as a result of the thermomechanical properties of the solder. Other fixing methods besides laser soldering benefit from the use of the disclosed techniques. In general, minimizing the gap between a fiber and a fiber support is of great importance in any fiber fixing process.

It should be appreciated that the present invention can be implemented in numerous ways, including as a process, an apparatus, a system, a device, a method, or a computer readable medium. Several inventive embodiments of the present invention are described below.

In one embodiment, a method of aligning an optical fiber for coupling light to or from an optical device and fixing the optical fiber to an optical fiber support is disclosed. The method includes positioning the optical fiber into alignment with the optical device. An adapter is positioned between the optical fiber and the optical fiber support. The adapter is formed to substantially fill a gap between the optical fiber and the optical fiber support. The adapter is fixed to the optical fiber support and the adapter is fixed to the optical fiber.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, details relating to technical material that is known in the technical fields related to the invention has not been described in detail in order not to unnecessarily obscure the present invention in such detail.

Long term maintenance of alignment under changing thermal conditions for an optical fiber mounted using solder is influenced by the amount of solder required to fill the gap between the optical fiber or optical fiber holder attached to the optical fiber and the pedestal or base upon which the optical fiber rests and the melting temperature of the solder. As described above, the thermomechanical properties of the solder tend to differ from the thermomechanical properties of the substrate and the pedestal that holds the optical fiber and the pedestal that holds the optoelectronic device. For purpose of the example system that follows, the optoelectronic device that is optically coupled to the optical fiber will be referred to as a laser diode and the specific properties of a laser diode will be described. It should be noted, however, that the described structures and methods are also applicable to aligning an optical fiber with other optoelectronic devices such as detectors. In general, laser diodes tend to be the devices with the smallest active area that is optically coupled to the optical fiber and so describing the use of the techniques disclosed herein in connection with coupling light from a laser diode to the optical fiber is most instructive.

A laser diode light source is generally not symmetric in shape. That is, the laser diode horizontal dimension is not the same as the vertical dimension. Conventionally, the vertical direction is referred to as the y direction and the horizontal direction is referred to as the x direction. The z direction is the direction from the optical fiber towards the laser diode. That convention is observed herein. Because the y dimension is less than the x dimension, the amount of coupling is more sensitive to variations in the y direction than it is to variations in the x direction. Therefore, it is important to minimize the linear amount of solder in the y direction that supports the optical fiber. To do this, the dimension of the gap that exists between the fiber and the fiber support base before the fiber is soldered in the y direction must be minimized. Conventional systems where the optical fiber is aligned using the micro positioning techniques described above allow the optical fiber to be moved or positioned with respect to an optical fiber support base.

As the fiber is positioned, the gap between the fiber and the base may either increase or decrease in size. Controlling the size of the gap is largely dependent on precisely machining the base to contact the fiber at exactly the point that will align the fiber with the laser diode which is supported by another base on the substrate. In fact, aligning the optical fiber base precisely in the correct position requires several precision machining steps. For example, using the example system shown in FIG. 2, in order to position the top of pedestal 212 to precisely align the optical fiber 202 with the optoelectronic device 204, it is necessary to precision machine the size of pedestal 214, and to make certain that substrate 210 is perfectly flat. It is also necessary to precision machine pedestal 212.

Because each of the error tolerances of the mechanical parts are additive, it is likely for any given system that a substantial gap may exist between optical fiber 202 and pedestal 212 when the fiber is aligned. It should be noted that although the example system used in FIG. 2 is described, the problem is also found in other system configurations and that the techniques disclosed herein are applicable to such other systems. For example, Beranek, et al. also discloses a system where an optical fiber is aligned with an optoelectronic device leaving a substantial gap between the optical fiber and the base which supports the optical fiber. That gap is filled in with the solder material used to fix the optical fiber to the base.

In one embodiment an optical fiber is positioned with respect to an optoelectronic device using a micro positioner. Once the optical fiber is positioned for maximum coupling, an adapter is positioned along the length of the fiber. The adapter is configured to engage the surface of the base used to support the optical fiber and thus leave almost no gap between the adapter and the base. Likewise, the adapter includes a precision drilled hole that is matched to the diameter of the optical fiber. When the adapter is properly positioned along the length of the optical fiber, the adapter is soldered to the metallized surface of the optical fiber at the edges of the hole and the surface of the adapter that engages the base is soldered to the base. Thus, using the adapter enables the amount of solder to fill gaps between the optical fiber and the base to be minimized.

Figure 3A:
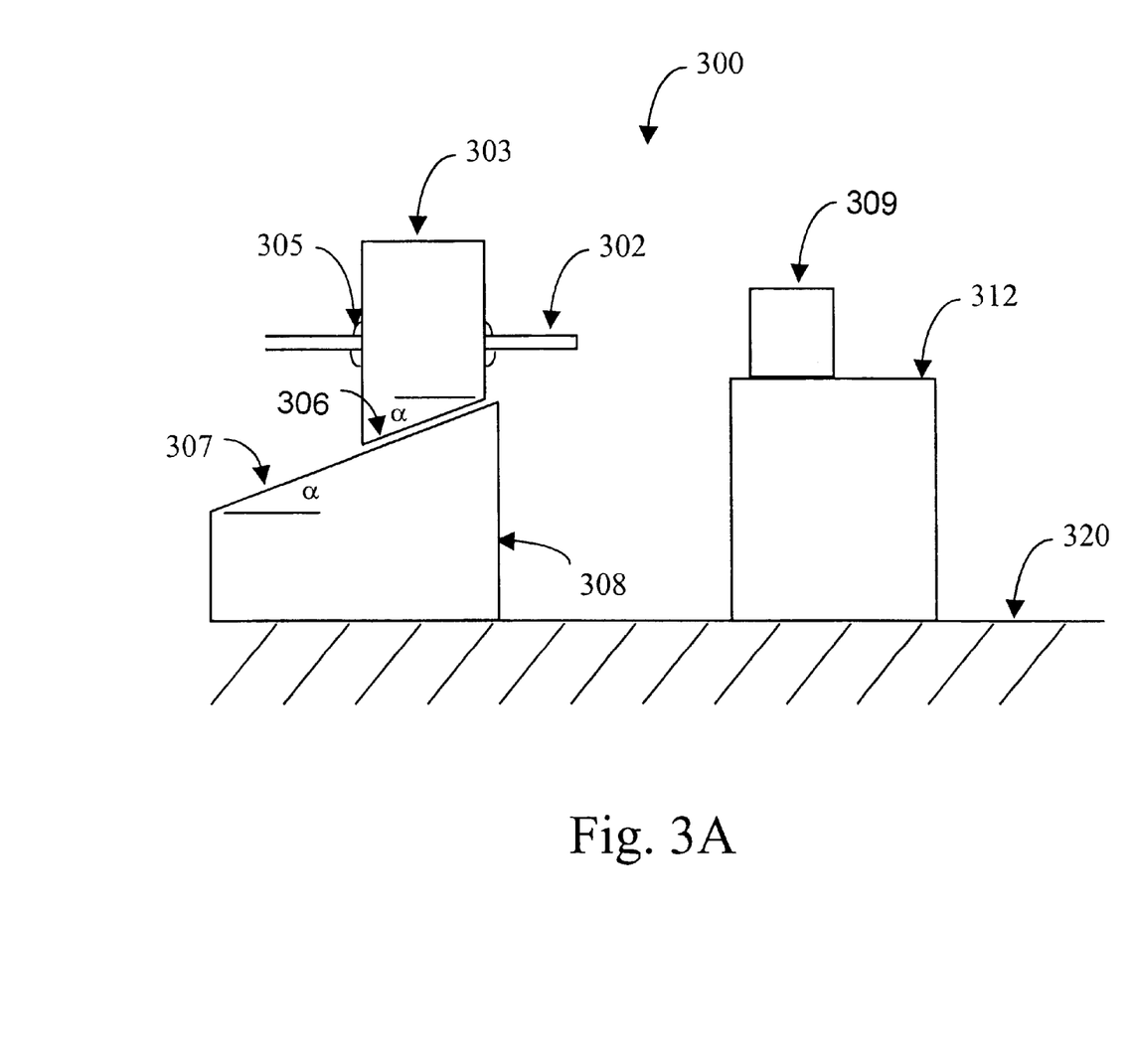
FIG. 3A is a diagram illustrating an adapter.

FIG. 3A is a diagram illustrating an adapter used in one embodiment. An optoelectronic system 300 is shown that includes an optical fiber 302 that is precisely aligned with an optoelectronic device 309. Optoelectronic device 309 is supported by a base 312. As mentioned above, when optoelectronic device 309 is a laser diode, alignment in the vertical or y direction is most critical. Optical fiber 302 is first aligned with optoelectronic device 309 using a micro positioner and, in one embodiment, a feedback technique as described above that includes measuring the amount of light coupled into the fiber from the laser diode and adjusting the position of the fiber so that the coupled light is maximized. Once optical fiber 302 is aligned, an adapter 303 is slid along the longitudinal axis of the optical fiber that runs through the center of the fiber and points toward the optoelectronic device.

Adapter 303 includes a slanted surface 306 that is configured to engage a surface 307 of a base 308. Base 308 rests on a substrate 320 and supports the optical fiber 302 that is aligned with optoelectronic device 309. Once adapter 303 is longitudinally positioned on optical fiber 302 so that it surface 306 contacts surface 307 of base 308, the adapter is soldered to the metallized surface outer surface of the optical fiber using solder joints 305. In the embodiment shown, the adapter is shown soldered to the optical fiber at both sides of the adapter. In certain embodiments, only one side of the adapter may be soldered to the optical fiber. In addition, surface 306 of the adapter is also soldered to surface 307 of base 308. Thus, adapter 303 is positioned along the longitudinal access of optical fiber 302 to fill in the gap between optical fiber 302 and base 308 that results when optical fiber 302 is precisely aligned with optoelectronic device 309.

In the embodiment shown, surface 306 is a slanted surface that extends downward at an angle α from a horizontal direction. Likewise, the surface of base 308 extends upward from the horizontal at an angle α so that the surfaces tend to positively engage each other at all points along the length of surface 306. In one embodiment, adapter 303 is formed using a small slice of optical fiber ferrule. Optical fiber ferrule is commonly used in fiber connectors and is readily available and relatively inexpensive. Optical fiber ferrule includes a precision hole and the surface 306 may readily be formed by etching using either a chemical or mechanical process such as grinding, polishing or dicing. Likewise, surface 307 can be precisely formed at the matching angle by a chemical etching process or mechanical process such has grinding, polishing or dicing. Any mismatch in the angle α between the adapter and the base will result in some gap being formed that must be filled in with solder; however, a much smaller gap can be achieved using the configuration shown than can be obtained without adapter 303.

Figure 3B:
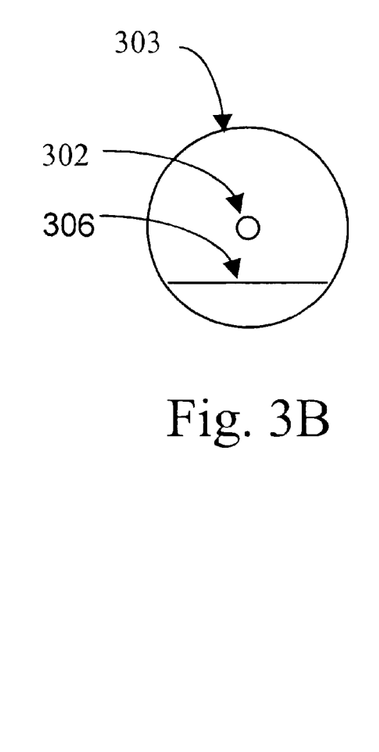
FIG. 3B is a diagram illustrating an end view of adapter.

FIG. 3B is a diagram illustrating an end view of adapter 303. Adapter 303 includes a precision hole into which an optical fiber 302 is inserted. Adapter 303 slides along the fiber inserted through the hole until the slanted surfaces of the adapter 306 engages the face 308 that supports the optical fiber.

This technique of using an angled adapter to engage the surface of the optical fiber base is also useful in optical array packaging systems where a linear array of fibers supported in a flat tape are simultaneously aligned with a set of optoelectronic devices or waveguides. In one embodiment, a silicon or ceramic carrier having v-grooves into which fibers from the linear array of fiber are positioned.

Figure 3C:
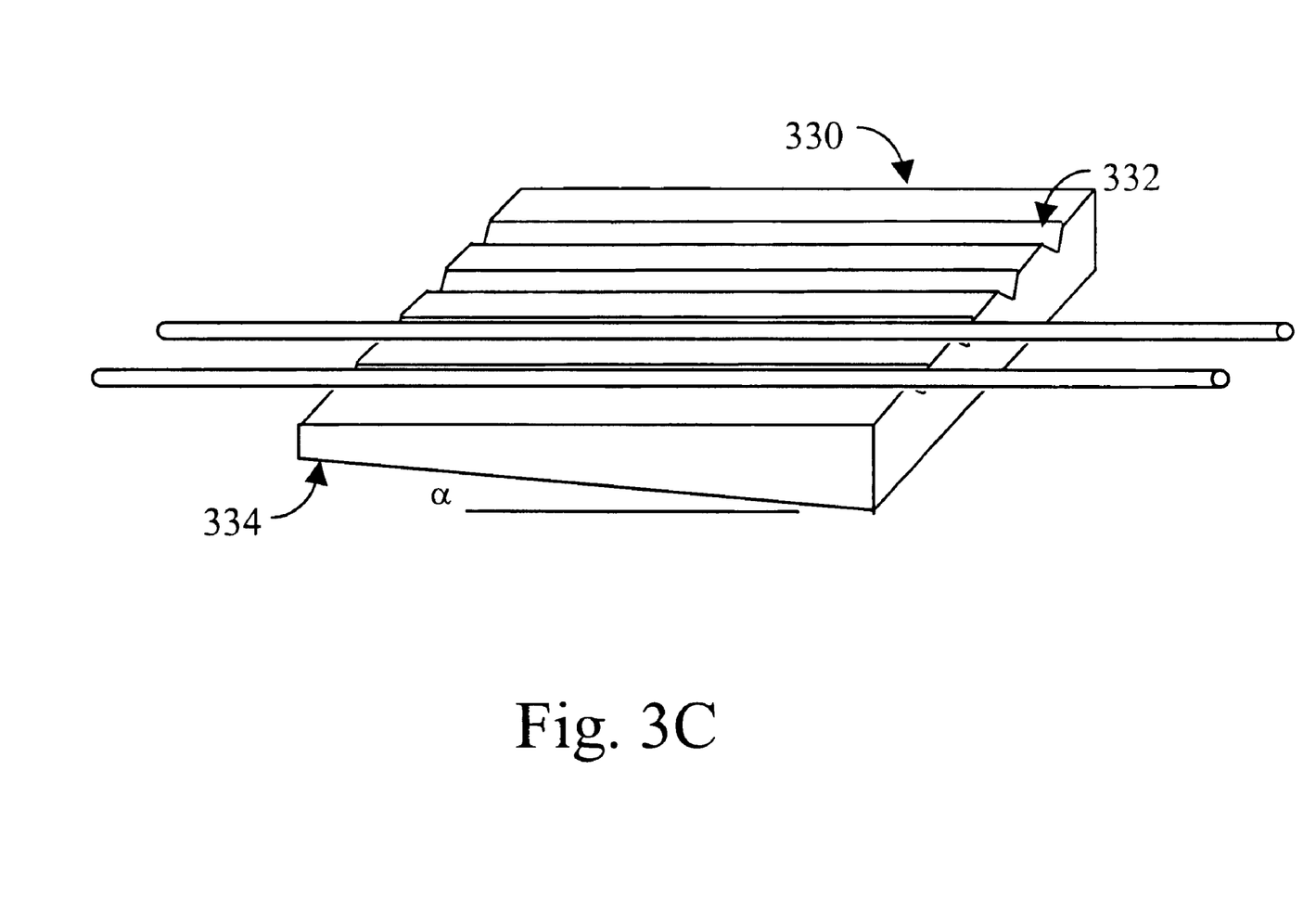
FIG. 3C is a diagram illustrating a multiple fiber carrier having an angled surface configured to engage the surface of a support base.

FIG. 3C is a diagram illustrating a multiple fiber carrier having an angled surface configured to engage the surface of a support base such as support base 308 shown in FIG. 3A. Multiple fiber carrier 330 includes a series of grooves 332 that support each of the optical fibers held by the carrier. In addition, the bottom surface 334 of carrier 330 is angled from the horizontal at an angle α which matches the angle α of the support base. The array of optical fibers are simultaneously aligned with a set of optoelectronic devices using a micropositioner and measurement techniques similar to the ones described above. Multiple fiber carrier 330 is then longitudinally positioned along the length of the fibers to engage the surface of the support base in a manner similar to the manner in which adapter 303 is longitudinally positioned along optical fiber 302 to engage support base 308 in FIG. 3A. Each of the optical fibers is then soldered to the v-groove in which it sits and the multiple optical fiber carrier 330 is soldered to the surface of the support base that it engages. Thus, a multiple fiber array carrier may be positioned to substantially fill in the gap between multiple fiber array and the support base that exists after the fiber array is aligned with a set of optoelectronic devices.

Thus far, a fiber adapter has been described that it is positioned along the optical fiber for the purpose of minimizing the gap between the optical fiber and the base or holder that supports the cable.

Figure 4:
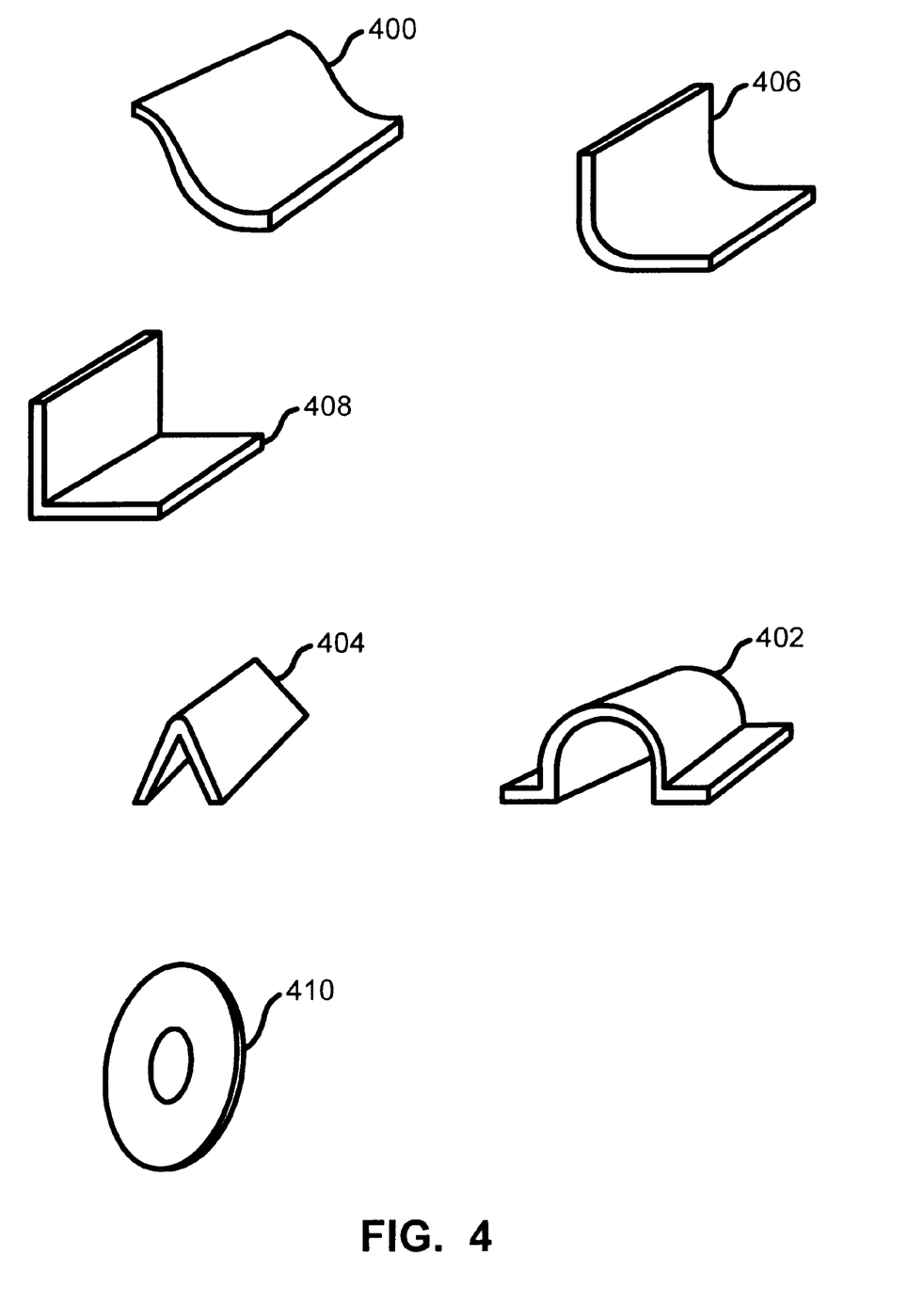
FIG. 4 is a diagram illustrating several solder preform shapes that may be used for the purpose of soldering an optical fiber or an optical fiber adapter to a base.

FIG. 4 is a diagram illustrating several solder preform shapes that may be used for the purpose of soldering an optical fiber or an optical fiber adapter to a base. It should be noted that the metallized optical fiber is itself soldered to an adapter in one embodiment. Metallization of the fiber is sufficient to allow soldering. In contrast, laser welding requires a metal fitting to be provided around the cable. In the embodiment shown in FIG. 3A, the optical fiber is soldered at the points where it extends through the adapter 303 and the adapter is soldered to the base. It should be noted that, in one embodiment, no solder preform is used to solder the adapter to the base. Instead, the surface of the adapter that engages the base is precoated with solder. However, in some embodiments, a solder preform may be used.

An S-shaped preform 400 is adapted to partially cover the top of a fiber and may be particularly useful to anchor the edge of a fiber array to an adapter. Similarly, a horseshoe shaped preform 402 is adapted to cover the top of a single fiber and it is useful to solder a fiber to a base that does not extend over the top of the fiber. A preform 404 is likewise adapted to extend over the top of a single optical fiber. A preform 406 and a preform 408 are adapted to lay along side a metallized optical fiber and to flow into the gap between the fiber and the surface of the adapter upon which the fiber rests. Preform 410 is adapted to slide along a fiber and rest against the surface of a fiber support.

It should be noted that using the laser soldering process to fix the optical fiber to its support base may be part of a parallel assembly process in which multiple beams are used to fix multiple electrical and optical components simultaneously.

Figure 5A:
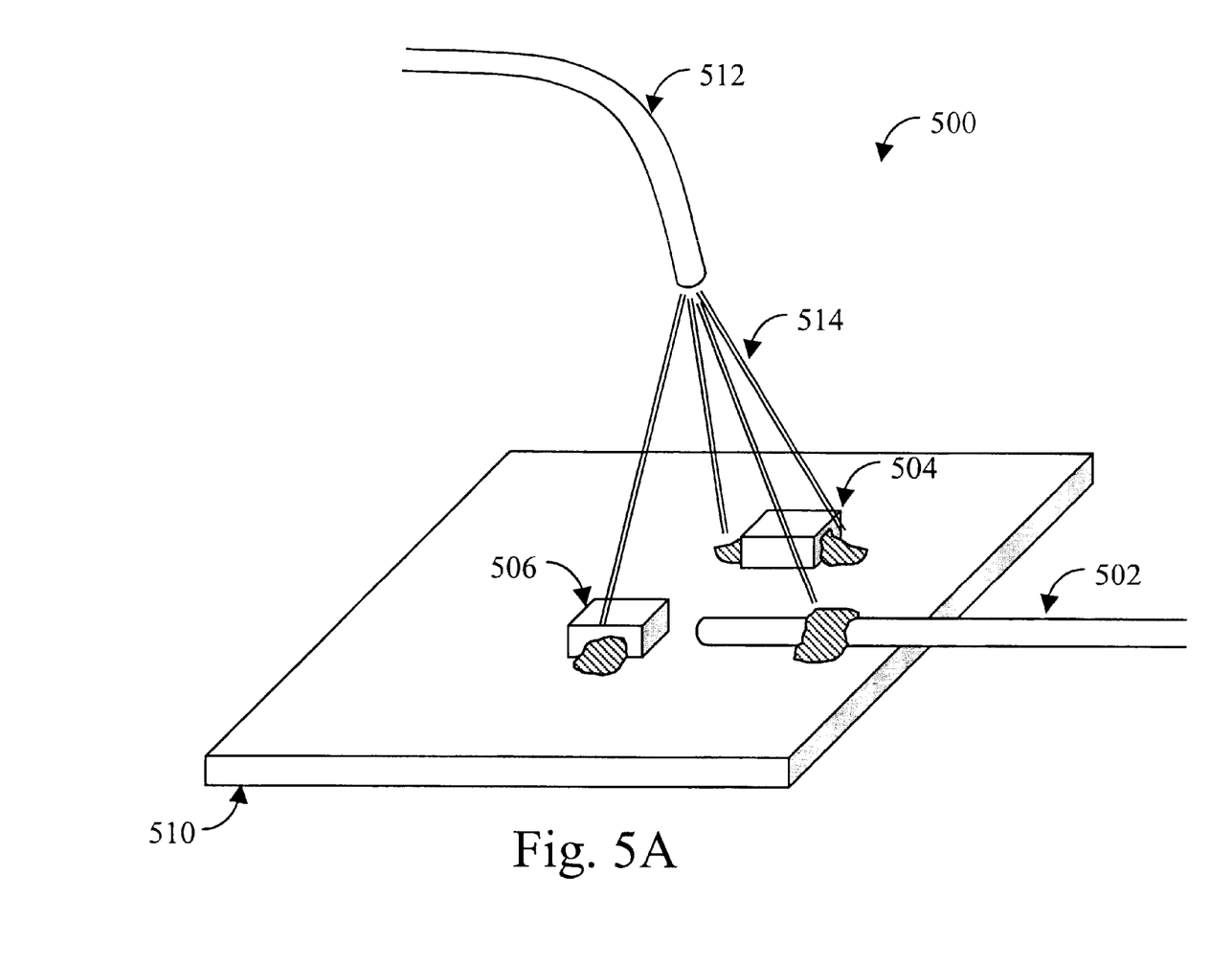
FIG. 5A is a block diagram illustrating a system assembled using parallel assembly.

FIG. 5A is a block diagram illustrating a system assembled using parallel assembly. The system 500 includes an optical fiber 502 and an electronic chip 504 and another electronic chip 506 all fixed to a multi-chip module base 510. An optical delivery cable 512 provides multiple beams 514 for simultaneous attachment of multiple components.

In another embodiment, a mini-Dual In-Line (mini-DIL) package is used to hold an optoelectronic device such as a laser diode coupled to an optical fiber.

Figure 5B:
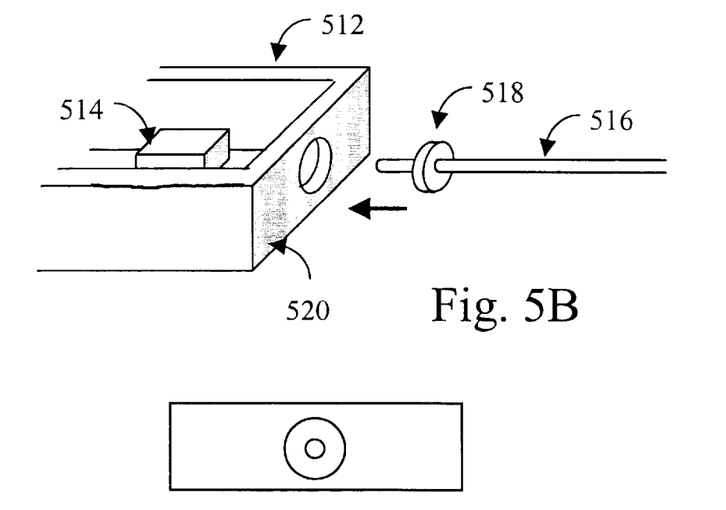
FIG. 5B is a block diagram illustrating mini-DIL package that holds a laser diode.

FIG. 5B is a block diagram illustrating mini-DIL package 512 that holds a laser diode 514. An optical fiber 516 is aligned with laser diode 514. Once optical fiber 516 is aligned with laser diode 514, an adapter 518 is slid along the length of the fiber until it rests against a side 520 of the mini-DIL package. Adapter 518 may be formed from a thin slice of fiber ferrule that has a precision hole through which the fiber may be inserted. The surface of the fiber is metallized so that it may be soldered to the ferrule. The ferrule is soldered to the side 520 of the mini-DIL package. Thus, the fiber is aligned first with the laser diode 514 and the adapter 518 is then brought into position to fix the fiber through the mini-DIL package. When adapter 518 is soldered to the side 520 of the mini-DIL package, a solder preform may be used to deliver solder to the desired location. In one embodiment, solder is preapplied to the surface of adapter 518 that engages the side of the mini-DIL package.

A system packaged in the manner shown in FIG. 5B may be provided as an uncooled laser module or may be mounted on a thermal electric cooler (TEC) mounted in a package such as a 14-pin butterfly package to make a cooled laser diode module. Providing lasers in a mini-DIL package as shown allows the packing of more than one transmitter inside a single module.

Figure 5C:
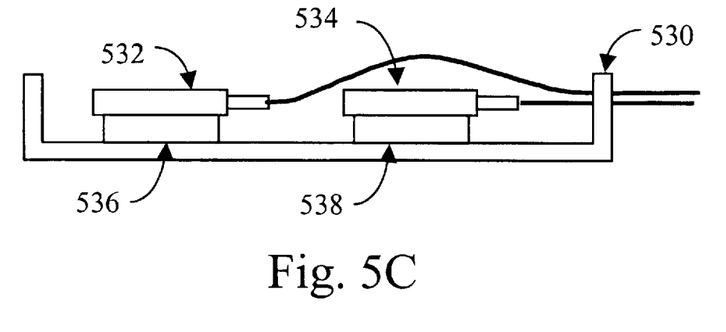
FIG. 5C is a diagram illustrating a multi-package system.

FIG. 5C is a diagram illustrating such a system. A package 530 holds a first mini-DIL package 532 and a second mini-DIL package 534. Each mini-DIL package is coupled to a optical fiber as shown in FIG. 5B. Mini-DIL package 532 is mounted on a first thermal-electric cooler 536 and mini-DIL package 534 is mounted on a second thermal-electric cooler 538.

Figure 6:
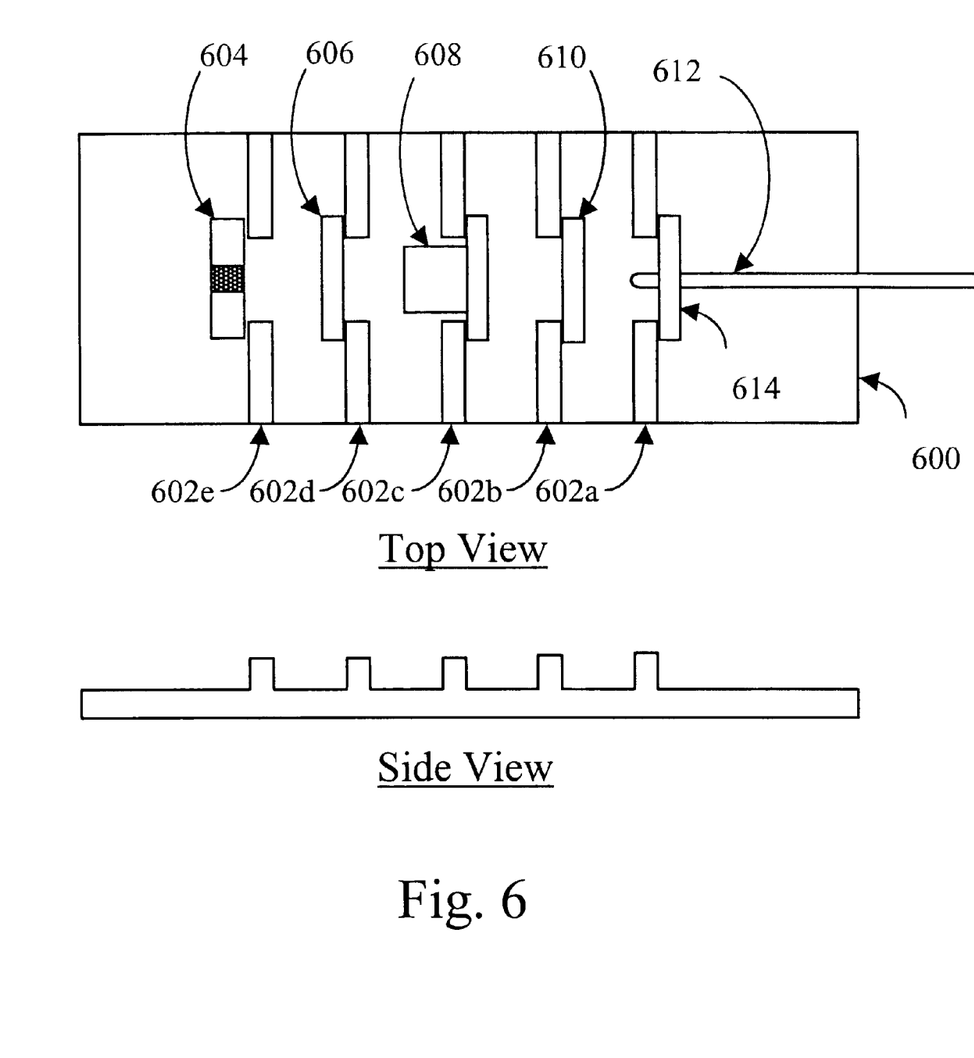
FIG. 6 is a block diagram illustrating another system that includes optical components fixed to vertical mounts using a laser soldering processing.

FIG. 6 is a block diagram illustrating another system that includes optical components fixed to vertical mounts using a laser soldering processing. A platform 600 includes a set of upwardly extended support walls 602a through 602e. Various optical components are aligned and soldered to the upwardly extending support walls. An optoelectronic device 604 such as a laser diode or a photodiode with submount is mounted to support walls 602e. A lens 606 with a holder is mounted to support walls 602d. An optical isolator 608 is mounted to support walls 602c. A second lens 610 with a holder is mounted to support walls 602e. Finally, a optical fiber 612 is mounted to support walls 602a. As described above, optical fiber 612 may be first aligned with the optical system and then an adapter 614 may be slid along the optical fiber to contact support walls 602a. Adapter 614 is then soldered to the support walls and is also soldered to the metallized surface of optical fiber 612 to fix the optical fiber in place.

Thus, an entire optical train may be assembled on a platform having upwardly extending support walls using laser soldering. The platform may be constructed of a ceramic or a metal or silicon material and the entire platform may be attached to a thermal-electric cooler. Each of the upwardly extending support walls may be metallized so that the various components may be soldered to them. Solder may be applied either by using a preform or alternatively, solder material can be sputtered or evaporated directly onto the upwardly extending support walls and the optical components or optical component holders that are attached to the walls.

A method using laser soldering to fix an optical fiber in an aligned position relative to an optoelectronic device has been disclosed.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An optoelectronic system comprising:

an optical fiber having a longitudinal axis;

an optical device aligned with said optical fiber to allow light to be coupled between the optical device and the optical fiber;

an optical fiber support configured to support the optical fiber in alignment with the optical device; and an adapter having an opening configured to receive the optical fiber and to allow the adapter to be positioned longitudinally along the longitudinal axis of the optical fiber, the adapter being positioned along the longitudinal axis of the optical fiber to a position where the adapter engages the optical fiber support;

wherein the adapter includes an outer surface and the outer surface includes an adapter slanted surface extending toward the longitudinal axis of the optical fiber.

2. An optoelectronic system as recited in claim 1 wherein the optical fiber support includes a support slanted surface extending upward toward the optical fiber and the support slanted surface engages the adapter slanted surface.

3. An optoelectronic system comprising:

an optical fiber having a longitudinal axis;

an optical device aligned with said optical fiber to allow light to be coupled between the optical device and the optical fiber;

an optical fiber support configured to support the optical fiber in alignment with the optical device; and an adapter having an opening configured to receive the optical fiber and to allow the adapter to be positioned longitudinally along the longitudinal axis of the optical fiber, the adapter being positioned along the longitudinal axis of the optical fiber to a position where the adapter engages the optical fiber support;

wherein the adapter is a cylindrical disc and the optical fiber support is the wall of an optical package.

4. An optoelectronic system as recited in claim 3 wherein the optical package is a ceramic package.

5. An optoelectronic system as recited in claim 3 wherein the optical package is a metal package.

6. An optoelectronic system as recited in claim 3 wherein the optical package is a mini-DIL package.

7. An optoelectronic system as recited in claim 6 wherein the mini-DIL package is mounted on a thermal electric cooler in a module that contains a plurality of optical devices.

8. A method of aligning an optical fiber having a longitudinal axis with an optical device and fixing the optical fiber to an optical fiber support configured to support the optical fiber in alignment with the optical device comprising:

aligning said optical fiber to allow light to be coupled between the optical device and the optical fiber;

positioning an adapter along the longitudinal axis of the optical fiber to a position where the adapter engages the optical fiber support, the adapter having:

an opening configured to receive the optical fiber and to allow the adapter to be positioned longitudinally along the longitudinal axis of the optical fiber; and an outer surface and the outer surface includes an adapter slanted surface extending toward the longitudinal axis of the optical fiber; and fixing the adapter to the optical fiber support and fixing the adapter to the optical fiber.

9. A method of aligning an optical fiber having a longitudinal axis with an optical device and fixing the optical fiber to an optical fiber support configured to support the optical fiber in alignment with the optical device as recited in claim 8 wherein the optical fiber support includes a support slanted surface extending upward toward the optical fiber and the step of positioning comprises positioning the adapter such that the adapter slanted surface engages the support slanted surface.

10. A method of aligning an optical fiber having a longitudinal axis with an optical device and fixing the optical fiber to an optical fiber support configured to support the optical fiber in alignment with the optical device comprising:

aligning said optical fiber to allow light to be coupled between the optical device and the optical fiber;

positioning an adapter along the longitudinal axis of the optical fiber to a position where the adapter engages the optical fiber support, wherein:

the adapter has an opening configured to receive the optical fiber and to allow the adapter to be positioned longitudinally along the longitudinal axis of the optical fiber;

the adapter is a cylindrical disc; and the optical fiber support is the wall of an optical package; and fixing the adapter to the optical fiber support and fixing the adapter to the optical fiber.

11. A method of aligning an optical fiber having a longitudinal axis with an optical device and fixing the optical fiber to an optical fiber support configured to support the optical fiber in alignment with the optical device as recited in claim 10 wherein the optical package is a ceramic package.

12. A method of aligning an optical fiber having a longitudinal axis with an optical device and fixing the optical fiber to an optical fiber support configured to support the optical fiber in alignment with the optical device as recited in claim 10 wherein the optical package is a metal package.

13. A method of aligning an optical fiber having a longitudinal axis with an optical device and fixing the optical fiber to an optical fiber support configured to support the optical fiber in alignment with the optical device as recited in claim 10 wherein the optical package is a mini-DIL package.

14. A method of aligning an optical fiber having a longitudinal axis with an optical device and fixing the optical fiber to an optical fiber support configured to support the optical fiber in alignment with the optical device as recited in claim 13 wherein the mini-DIL package is mounted on a thermal electric cooler in a module that contains a plurality of optical devices.

* * * * *